(12) United States Patent
Mazzucco et al.

(10) Patent No.: US 9,015,227 B2
(45) Date of Patent: Apr. 21, 2015

(54) DISTRIBUTED DATA PROCESSING SYSTEM

(75) Inventors: Michele Mazzucco, Larnaca (CY); Paul F McKee, Colchester (GB); Michael A Fisher, Ipswich (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 826 days.

(21) Appl. No.: 13/061,623

(22) PCT Filed: Aug. 24, 2009

(86) PCT No.: PCT/GB2009/002067
§ 371 (c)(1),
(2), (4) Date: Mar. 1, 2011

(87) PCT Pub. No.: WO2010/026362
PCT Pub. Date: Mar. 11, 2010

(65) Prior Publication Data
US 2011/0167112 A1    Jul. 7, 2011

(30) Foreign Application Priority Data

Sep. 8, 2008   (EP) ..................................... 08252968
Sep. 9, 2008   (GB) ................................... 0816476.6

(51) Int. Cl.
*G06F 15/16*    (2006.01)
*G06F 9/50*    (2006.01)
*H04L 29/08*    (2006.01)

(52) U.S. Cl.
CPC ............ *G06F 9/505* (2013.01); *H04L 67/1002* (2013.01); *H04L 67/1023* (2013.01); *G06F 2209/5019* (2013.01)

(58) Field of Classification Search
CPC ..... H04L 67/10; H04L 67/32; H04L 67/1002; H04L 67/1008; H04L 43/08
USPC ........................................... 709/203; 718/101
See application file for complete search history.

(56) References Cited

U.S. PATENT DOCUMENTS 6,748,414 B1   6/2004  Bournas
7,184,945 B1*  2/2007  Takahashi et al. .............. 703/22
(Continued)

FOREIGN PATENT DOCUMENTS

| EP | 1 612 674 | 1/2006 |
| EP | 1 613 109 | 1/2006 |
| EP | 1 879 136 | 1/2008 |

OTHER PUBLICATIONS

International Search Report for PCT/GB2009/002067, mailed Jan. 25, 2010.

(Continued)

*Primary Examiner* — Duyen Doan
(74) *Attorney, Agent, or Firm* — Nixon & Vanderhye P.C.

(57) ABSTRACT

A distributed data processing system is disclosed. A problem with distributed data processing systems, especially data centres, is the low level of utilisation of those data centres. This is, in part, owing to data centre providers being concerned not to attract financial penalties levied by their customers in response to the quality of service provided to those customers by the data centre falling below service level agreed in service level agreements. Embodiments are disclosed which tackle this problem by having the data centre control the load placed upon it by carrying out an assessment of the likely impact of performing a requested bundle of jobs on jobs which are already running in the data centre. The decision whether to provide the requested bundle of jobs is then made by weighing-up the expected increase in penalties payable to customers against the revenue expected in return for running the requested bundle of jobs.

25 Claims, 8 Drawing Sheets

(56) References Cited

U.S. PATENT DOCUMENTS

| | | | |
|---|---|---|---|
| 7,483,883 B2* | 1/2009 | Barth et al. | 1/1 |
| 2004/0190441 A1 | 9/2004 | Alfakih et al. | |
| 2005/0081211 A1* | 4/2005 | Koga et al. | 718/105 |
| 2005/0273456 A1* | 12/2005 | Revanuru et al. | 707/1 |
| 2006/0094446 A1 | 5/2006 | Duan | |
| 2007/0005801 A1* | 1/2007 | Kumar et al. | 709/238 |
| 2007/0074215 A1 | 3/2007 | Bethea et al. | |
| 2007/0124431 A1* | 5/2007 | Sharma | 709/219 |
| 2007/0156919 A1* | 7/2007 | Potti et al. | 709/238 |
| 2007/0180113 A1* | 8/2007 | Van Bemmel | 709/226 |
| 2007/0220516 A1* | 9/2007 | Ishiguro et al. | 718/101 |
| 2008/0025230 A1* | 1/2008 | Patel et al. | 370/252 |
| 2008/0104605 A1 | 5/2008 | Steinder et al. | |
| 2008/0177872 A1 | 7/2008 | Vengroff | |
| 2010/0325252 A1* | 12/2010 | Stuhlmeyer | 709/222 |

OTHER PUBLICATIONS

Arlitt, Martin, Diwakar Krishnarnurtlay, and Jerry Rolia. "Characterizing the scalability of a large web-based shopping system." *ACM Transactions on Internet Technology* 1.1 (2001): 44-69 (26 pgs).

Shivam, Piyush, Shivnath Babu, and Jeffrey S. Chase. "Learning application models for utility resource planning." *Autonomic Computing, 2006. ICAC'06. IEEE International Conference on.* IEEE, 2006 (10 pgs.).

Ronald P. Doyle, Jeffrey S. Chase, Omer M. Asad, Wei Jin, and Amin M. Vahdat. 2003. Model-based resource provisioning in a web service utility. In *Proceedings of the 4th conference on USENIX Symposium on Internet Technologies and Systems—vol. 4* (USITS'03), vol. 4. USENIX Association, Berkeley, CA, USA, 5-5, Mar. 26-28, 2003 (15 pgs.).

Villela, D.; Pradhan, P.; Rubenstein, D., "Provisioning servers in the application tier for e-commerce systems," *Quality of Service, 2004. IWQOS 2004. Twelfth IEEE International Workshop on*, vol., no., pp. 57,66, Jun. 7-9, 2004 (10 pgs.).

Pacifici, G.; Spreitzer, M.; Tantawi, A.N.; Youssef, A., "Performance management for cluster-based web services," *Selected Areas in Communications, IEEE Journal on*, vol. 23, No. 12, pp. 2333,2343, Dec. 2005 (11 pgs.).

R. Levy, J. Nagarajarao, G. Pacifici, M. Spreitzer, A. Tantawi, A. Youssef, "Performance Management for Cluster Based Web Services", Integrated Network Management VIII, IFIP—The International Federation for Information Processing vol. 118, 2003, pp. 247-261 (15 pgs.).

Zhen Liu, Mark S. Squillante, and Joel L. Wolf. 2001. On maximizing service-level-agreement profits. In *Proceedings of the 3rd ACM conference on Electronic Commerce* (EC '01). ACM, New York, NY, USA, 213-223 (11 pgs.).

Ranjan, S.; Rolia, J.; Fu, H.; Knightly, E., "QoS-driven server migration for Internet data centers," *Quality of Service, 2002. Tenth IEEE International Workshop on*, vol., no., pp. 3,12, 2002 (10 pgs.).

Kephart, J. O. and Chess, D. M. 2003. The Vision of Autonomic Computing. *Computer* 36, 1 (Jan. 2003), 41-50 (10 pgs.).

Kanodia, V.; Knightly, E.W., "Multi-class latency-bounded Web services," *Quality of Service, 2000. IWQOS. 2000 Eighth International Workshop on*, vol., no., pp. 231-239, 2000 (9 pgs.).

N.Bartolini, G.Bongiovanni, S.Silvestri, "*An autonomic admission control policy for distributed web systems*". IEEE Proceedings of the International Symposium on Modeling, Analysis, and Simulation of Computer and Telecommunication Systems (MASCOTS-2007) (7 pgs.).

Carlstrom, J.; Rom, R., "Application-aware admission control and scheduling in Web servers," *INFOCOM 2002. Twenty-First Annual Joint Conference of the IEEE Computer and Communications Societies. Proceedings. IEEE*, vol. 2, no., pp. 506-515 vol. 2, 2002 (10 pgs.).

Urgaonkar, B. and Shenoy, P. 2005. Cataclysm: policing extreme overloads in internet applications. In *Proceedings of the 14th international Conference on World Wide Web* (Chiba, Japan, May 10-14, 2005). WWW '05. ACM, New York, NY, 740-74 (10 pgs.).

Cherkasova, L. and Phaal, P. 2002. Session-Based Admission Control: A Mechanism for Peak Load Management of Commercial Web Sites. *IEEE Trans. Comput.* 51, 6 (Jun. 2002) (10 pgs.).

Chen, X., Mohapatra, P., and Chen, H. 2001. An admission control scheme for predictable server response time for web accesses. In *Proceedings of the 10th international Conference on World Wide Web* (Hong Kong, Hong Kong, May 1-5, 2001) (10 pgs.).

Apache Synapse Enterprise Service Bus 1.1.1 Release Note—Jan. 29, 2008 (1 pg.).

Mule (software)—Wikipedia Page—Jan. 19, 2008 (2 pgs.).

Apache ServiceMix—Wikipedia Page—Jan. 30, 2008 (2 pgs.).

Open ESB—Wikipedia Page—Jun. 6, 2007 (1 pg.).

Badidi, E., Esmahi, L., and Serhani, M. A. 2005. A Queuing Model for Service Selection of Multi-classes QoS-aware Web Services. In *Proceedings of the Third European Conference on Web Services* (Nov. 14-16, 2005). ECOWS. IEEE Computer Society (9 pgs.).

Matt Welsh and David Culler. Adaptive Overload Control for Busy Internet Servers. In *Proceedings of the 4th USENIX Conference on Internet Technologies and Systems (USITS'03)*, Mar. 2003—see https://www.usenix.org/legacy/events/usits03/tech/full_papers/welsh/welsh.pdf.

Urgaonkar, B.; Shenoy, P.; Chandra, A.; Goyal, P., "Dynamic Provisioning of Multi-tier Internet Applications," *Autonomic Computing, 2005. ICAC 2005. Proceedings. Second International Conference on*, vol., no., pp. 217-228, Jun. 13-16, 2005 (12 pgs.).

M.N. Bennani and D. Menasce, "Resource allocation for autonomic data centers using analytic performance methods", Procs., 2nd IEEE Conf. on Autonomic Computing (ICAC-05), pp. 229-240,2005 (12 pgs.).

A. Chandra, W. Gong and P. Shenoy, "Dynamic resourse allocation for shared data centers using online measurements", Procs., 11th ACM/IEEE Int. Workshop on Quality of Service (IWQoS), pp. 381-400,2003 (2 pgs.).

M. Mazzucco, I. Mitrani, J. Palmer, M. Fisher and P. McKee, "Web Service Hosting and Revenue Maximization", Procs., 5th European Conf. on Web Services (ECOWS'07), 2007 (10 pgs.).

Daniel A. Menascé, Mohamed N. Bennani, Honglei Ruan, "On the Use of Online Analytic Performance Models, in Self-Managing and Self-Organizing Computer Systems", Self-star Properties in Complex Information Systems, Lecture Notes in Computer Science, vol. 3460, 2005, pp. 128-142 (15 pgs.).

Ka-man Lam; Ho-fung Leung, "An Adaptive Strategy for Resource Allocation Modeled as Minority Game," *Self-Adaptive and Self-Organizing Systems, 2007. SASO '07. First International Conference on*, vol., no., pp. 193,204, Jul. 9-11, 2007 (10 pgs.).

Daniel Villela, Prashant Pradhan, and Dan Rubenstein. 2007. Provisioning servers in the application tier for e-commerce systems. ACM Trans. Internet Technol. 7, 1, Article 7 (Feb. 2007) (23 pgs.).

Matt Welsh, David Culler, and Eric Brewer. 2001. SEDA: an architecture for well-conditioned, scalable internet services. In Proceedings of the eighteenth ACM symposium on Operating systems principles (SOSP '01). ACM, New York, NY, USA, 230-243 (15 pgs.).

C Musciano, B Kennedy: "HTML The Definitive Guide" Aug. 1998, O'Reilly, Sebastopol, Calif., USA, XP002508958 Section 1.2.2 The Flow of Information * p. 6-p. 7 * * p. 129, last paragraph * Section 5.2.6.1 The src attribute * p. 133 * (8 pgs.).

Extended European Search Report dated Jan. 8, 2009 issued in European Application No. EP 08 25 2968 (8 pgs.).

Ian Angus, An Introduction to Erlang B and Erlang C—Telemanagement #187—Jan. 2001—http://www.tarrani.net/linda/ErlangBandC.pdf (4 pgs.).

Dyachuk, D.; Deters, R., "Optimizing Performance of Web Service Providers," *Advanced Information Networking and Applications, 2007. AINA '07. 21st International Conference on*, vol., no., pp. 46,53, May 21-23, 2007 (8 pgs.).

Continuous Media Sharing in Multimedia Database Systems, Mohan Kamath, Krithi Ramamritham, and Donald F. Towsley. DASFAA, vol. 5 of Advanced Database Research and Development Series, p. 79-86. World Scientific, (1995) (8 pgs.).

International Preliminary Report on Patentability dated Mar. 8, 2011 for PCT/GB2009/002067 (9 pgs.).

New Batch API—blog entry from Facebook software developer Wei Zhu dated Jan. 23, 2008 (2 pgs.).

* cited by examiner

| Job Type | Charge per Job | Penalty | Offered Average Waiting Time | Number of Admitted Bundles |
|---|---|---|---|---|
| 1 | | | | 5 |
| ...... | ...... | ...... | ...... | ...... |
| N | | | | 3 |

Figure 2

| Bundle Request |
|---|
| Job Type |
| Average Job Submission Rate |
| Number of jobs |

Figure 3

| Job Submission |
|---|
| Bundle ID |
| Job Type |
| Job Parameters |

Figure 4

| Bundle ID | 1 |
|---|---|
| Job Type | 1 |
| Agreed Job Submission Rate | |
| Agreed Number of Jobs | |
| Measured Average Wait Time | |
| Measured Average Service Time | |
| Bundle Status | [ ongoing or completed] |
| Revenue Due | |

Figure 5

| Bundle 1 Performance Log | | | | | |
|---|---|---|---|---|---|
| Job ID | Job Arrival Time | Job Start Time | Job Finish Time | Job Wait Time | Job Service Time |
| | | | | | |
| | | | | | |
| | | | | | |
| | | | | | |
| | | | | | |

Figure 6

DISTRIBUTED DATA PROCESSING SYSTEM

This application is the U.S. national phase of International Application No. PCT/GB2009/002067 filed 24 Aug. 2009, which designated the U.S. and claims priority to European Application No. 08252968.6, filed 8 Sep. 2008 and United Kingdom Application No. 0816476.6, filed 9 Sep. 2008, the entire contents of each of which are hereby incorporated by reference.

BACKGROUND AND SUMMARY

The present invention relates to a distributed data processing system, and to a method of operating a distributed data processing system.

Providers of data processing services often operate data centres which receive job requests from client computers via the World Wide Web and carry out some data processing in response to those requests, often returning the results of that processing to the requesting client computer.

Such data centres offer data processing services on behalf of many enterprises, such as retailers who use the data centre to offer an on-line shopping service to their customers in turn. The agreements between data centre operators and such enterprises often include expected service levels and provide for the data centre operator to pay a penalty to the enterprise in the event that the data centre fails to provide the agreed level of service.

This is a particular problem since the rate at which requests arrive from customers of an enterprise varies greatly and in an unpredictable way. The conventional solution to this problem is to over-engineer the data centre, which leads to the data centre being under-used most of the time.

European Patent application 1 612 674 discloses that access requests to an information processing system might be rejected or accepted in dependence upon the use of which of several available applications the information processing system is being requested to offer—in particular, the decision whether to admit the access request might depend on whether the requested application in question is overloaded. The decision whether to reject or accept the request might further depend on which client is making the request.

According to the present invention, there is provided a computer network comprising a client computer, a service provisioning system comprising a job admission controller and one or more server computers, and communication links connecting said client computer and service provisioning system;

said client computer being arranged in operation to:
i) generate a job bundle request message representing a request for said one or more server computers to carry out a plurality of instances of a data processing job;
ii) send said job bundle request message to said one or more server computers;
said job admission controller being arranged in operation to:
i) receive said job bundle request message;
ii) determine whether said service provisioning system is to provide said bundle of jobs;
iii) indicate said determination to said client computer;
said client computer further being arranged in operation to:
iv) on finding said indication to indicate that said bundle is accepted, send job requests belonging to said bundle to said service provisioning system;
said one or more server computers being arranged in operation to receive job requests in said bundle and to perform the jobs requested therein.

By aggregating a plurality of requests to perform a data processing job, into a single request to perform a bundle of data processing jobs, and, responding to said single request by carrying out a bundle admission test, the computational load associated with admission control is reduced. The significant benefits of admission control are kept—namely the increased predictability in the load placed on the one or more server computers, and hence the ability to run the one or more server computers at a higher utilisation level without introducing an unacceptable risk of detrimentally affecting jobs which are already running.

An advantage over admission control applied to individual jobs is that a user knows that once a bundle of jobs is accepted each job in that bundle is carried out. Where admission control is applied to individual jobs the user cannot know which jobs will be performed and which will not.

It is to be noted that jobs are independent of one another—they are self-contained tasks—in other words the output of one data processing job is not used as the input to another.

BRIEF DESCRIPTION OF THE DRAWINGS

Specific embodiments of the invention will now be described, by way of example only, with reference to the accompanying drawings in which:

FIG. 2 shows a job type table stored by the controller computer for each job type;

FIG. 3 shows information included in a bundle request message sent from the enterprise network to the data centre;

FIG. 4 shows a subsequent job submission message sent from the enterprise network to the data centre;

FIG. 5 shows a job bundle summary table maintained by the controller computer for each admitted bundle;

FIG. 6 shows a bundle performance table maintained by the controller computer for each admitted bundle.

DETAILED DESCRIPTION OF PRESENT EXAMPLE EMBODIMENTS

Figure 1:
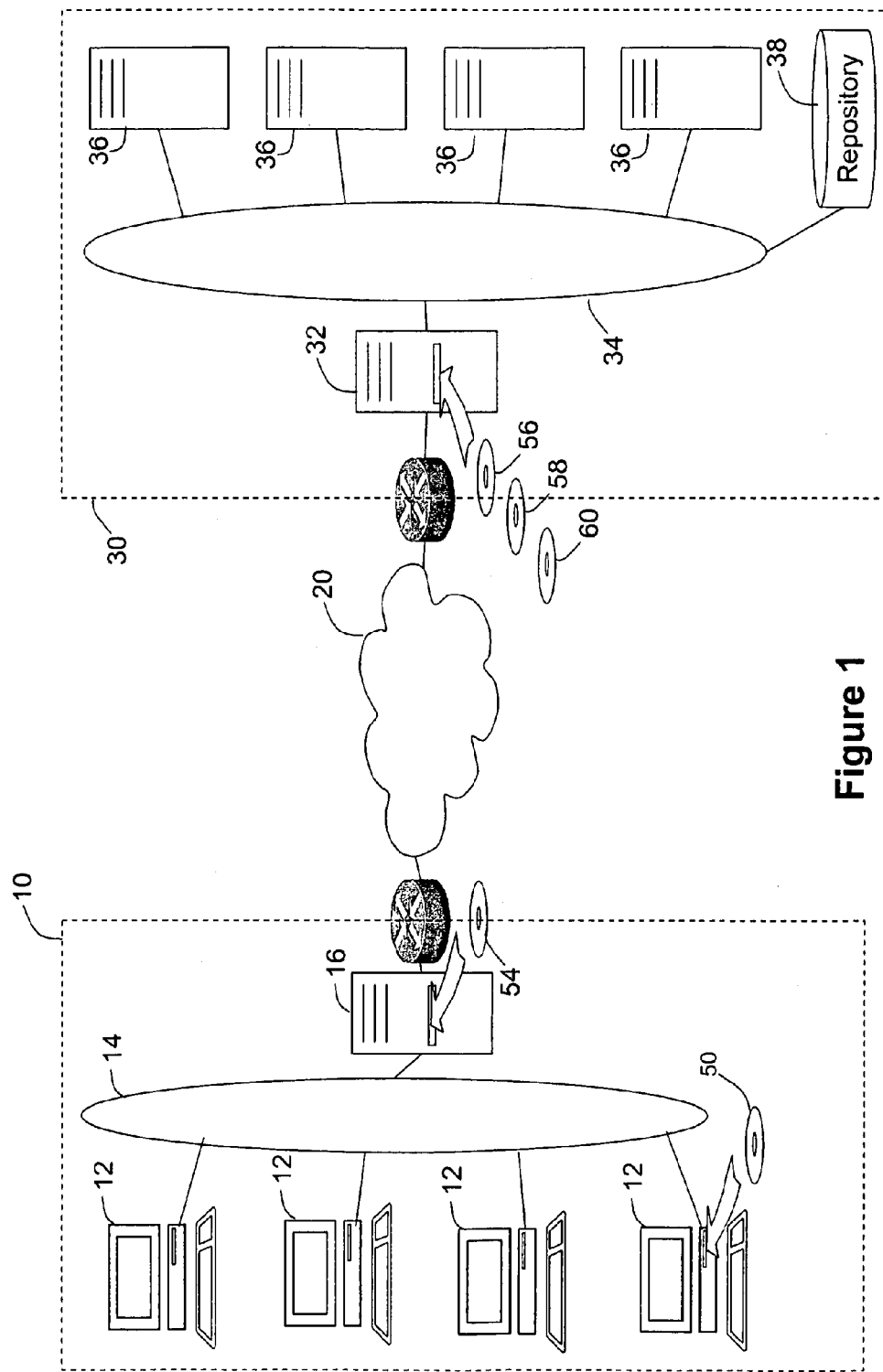
FIG. 1 shows a computer network which is used in a first embodiment.

FIG. 1 shows a computer network comprising an enterprise network 10 connected via the Internet 20 to a data centre 30.

The enterprise network 10 comprises a large number of personal computers 12 (only four are shown) connected via a local area network 14 to a proxy computer 16. Each personal computer includes conventional hardware—especially a hard disk for the storage of programs, a processor whose actions are controlled by such programs, a random access memory from which the processor fetches programs controlling its actions, a display and display card for controlling the display, a network interface card which enables the computer to send messages to (and receive messages from) a network, and one or more communication busses which provide for electronic digital communication between the various pieces of hardware mentioned. Also present on the hard disk is an operating system program and other utility programs.

For the purposes of this illustrative example embodiment, it is assumed that the enterprise owning enterprise network 10 is a retail telecommunication service company which provides its retail customers with telecommunication services on credit. As such, the company carries out a credit check on prospective customers prior to offering those customers telecommunications services.

Thus, each of the personal computers is provided with a credit check client program installed onto the computer's hard disk from CD-ROM or DVD-ROM 50. The credit check client program is executable to extract details of a potential customer from a customer service agent via a graphical user interface provided using the computer's display, and to forward those details in a message to proxy computer 16.

The proxy computer also has conventional hardware and software. In addition, a credit check proxy program is installed onto the computer's hard disk from CD-ROM or DVD-ROM 54. The credit check proxy program controls the proxy computer 16 to receive credit check requests from the personal computers 12 and to forward them across the Internet 20 to the data centre 30. On receiving a response to a credit check, the proxy computer 16 passes the response to whichever personal computer 12 issued the corresponding credit check request. Under control of the program, the proxy computer also keeps a record of the number of credit check requests the enterprise makes in each hour of the day. It thereby calculates and stores estimates of the number of credit checks likely in each hour of the day. Every hour, the proxy computer 16, under control of the credit check proxy program, makes a request to submit an estimated number of credit checks to the data centre 30. Provided that request is accepted, the proxy computer 16 then forwards the credit checks it receives over the following hour to the data centre 30.

The data centre 30 comprises a large number of server computers 36 connected via a local area network 34 to a controller computer 32. Also connected to the local area network is a large persistent memory, said as a RAID array 38. Those skilled in the art will be aware that the server computers 36 will normally take the form of blades or boards inserted into racks providing the server computers with shared storage and power facilities. Each of the server computers includes one or more processors whose actions are controlled by programs (often loaded from repository 38), a random access memory from which the processor fetches programs controlling its actions, a network interface card which enables the computer to send messages to, and receive messages from a network, and one or more communication busses which provide for electronic digital communication between the various pieces of hardware mentioned.

The server computers are able to perform a plurality of different job types. Suitable application programs are loaded from CD-ROM or DVD-ROM 56 onto the controller computer 32 which then stores those programs in repository 38. Also loaded onto controller computer 32 (from CD-ROM or DVD-ROM 58) is data centre management software which enables a data centre administrator to manage which application programs are available on which servers. In the present example, the server computers 36 data centre management software automatically arranges the server computers 36 into pools—each server in any given pool running an application program to provide a given job type. The data centre management software provides an interface which enables other programs to re-allocate the server computers 36 to different pools.

Also loaded onto controller computer 32 (from CD-ROM or DVD-ROM 60) is a job bundle management program which responds to requests to run bundles of jobs and thereafter monitors and records the performance of the data centre in running any accepted bundle of jobs.

The data centre provides a number of different applications to enterprise network. Each application provides a job type. FIG. 2 shows a job type table having N rows corresponding to the N job types offered by the data centre. The leftmost column of the table is a job type identifier. The job type on which this example concentrates, credit checks is job type 1. There are of course a huge number of possible job types, other possibilities include, for example, directory enquires services, postcode/address services or currency conversion services.

For each of the offered job types listed in the table, the data centre offers a service level agreement. Whilst the service level agreements currently used in practice are primarily concerned with the availability of the service (i.e. the job type), in the present example, the performance of the data centre in carrying out jobs of each type is monitored and forms part of the service level agreement. A performance parameter which is monitored by the controller computer 32 for each submitted job is the waiting time between the controller computer 32 receiving a job submission message and one of the server computers 36 starting to carry out that job. As will be explained in more detail below, in the present example, the enterprise network 10 bundles a plurality of job requests in a bundled request. The performance parameter used in the present example is correspondingly the average of the waiting times of all the jobs included in the bundle. A threshold level of the performance parameter which is not to be breached is offered by the data centre 30 and forms part of the service level agreement between the data centre 30 and its customers. Thus, in the present example, an average waiting time which should not be exceeded is recorded in the fourth column of the table. As part of the service level agreement, the data centre 30 agrees to offer a sum of money (a penalty) to a customer who submits a bundle of requests for a given type of job, has that bundle accepted by the data centre, and subsequently finds that the average waiting time exceeds the level recorded in the fourth column of the table. The amount of that penalty is stored in the third column of the table. A charge payable by the customer for each job of each job type carried out is recorded in the second column of the table.

Also recorded in the job type table is a count of the number of bundles of each job type active (i.e. admitted by not yet completed) at any given time (fifth column). The purpose of that count will be explained in more detail below.

FIG. 3 shows a bundle request message sent by proxy computer 16 in enterprise network 10 to controller computer 32 in data centre 30. The bundle request specifies the type of job that will constitute the bundle (first row), the number of instances of jobs of that type which are to be included in the bundle (third row), and the average rate at which the enterprise network estimates the job submissions within the bundle will arrive at the data centre 30.

FIG. 4 shows the format of a job submission message sent by the proxy computer 16 for each job in an admitted bundle of jobs. The job submission message includes a bundle identifier assigned to the bundle by the controller computer 32 (first row), a job identifier assigned to the job by the proxy computer 16 (second row), an indication of the job type (third row) and the parameters which the relevant application program running at the data centre 30 requires in order to carry out the job (fourth row). By way, of example, in the credit check application, the job parameters might be the individuals full name and address.

FIG. 5 shows a job bundle table maintained by the controller computer 32 for each bundle admitted by the controller computer 32. Each bundle table includes a unique bundle identifier (first row), the type of job in the bundle (second row), the job submission rate for the bundle (third row—this will match the figure in the second row of the Bundle Request (FIG. 3)), the number of jobs in the bundle (fourth row—this will match the figure in the third row of the Bundle Request), the measured average wait time for this bundle (fifth row), the measured average service time for this bundle (sixth row), the measured variation in wait time for this bundle (seventh row), the measured variation in service time for this bundle (eighth row), the bundle status—i.e. whether the bundle is currently being processed or whether all the jobs within the bundle have now been processed—(ninth row) and the actual revenue (tenth row) which the enterprise owes the data centre 30 for performing this bundle of jobs.

FIG. 6 shows a bundle performance log which the controller computer maintains for each admitted bundle. Entries in each record in that table include a Job ID (copied from the second row of the job submission message), a job arrival time (arrival at the controller computer 32), a job start time and job finish time (each reported to controller computer 32 by a server 36), a job wait time (the delay from the job arrival time to the job start time), and a job service time (the difference between the job finish time and the job start time).

Figure 7:
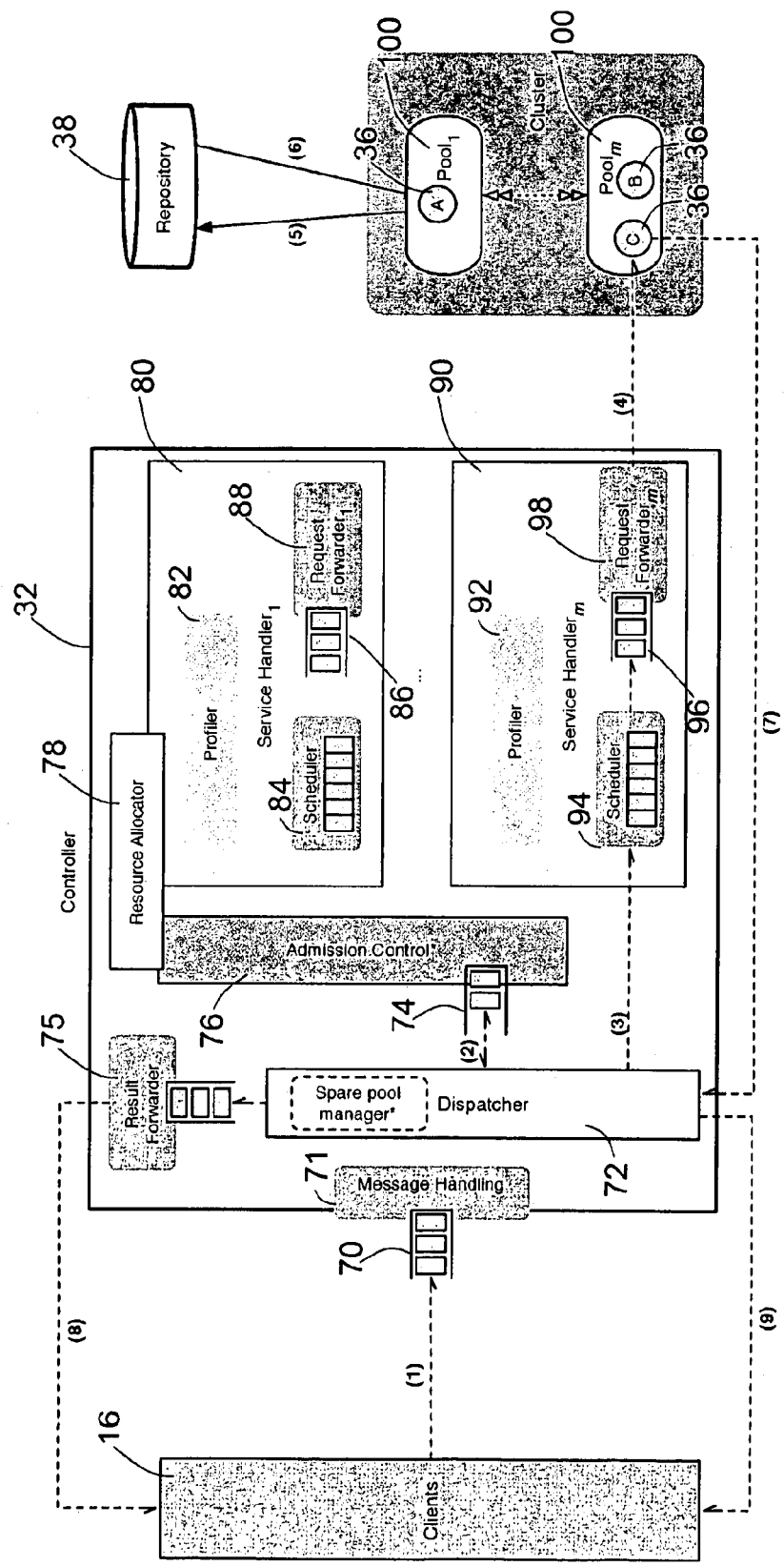
FIG. 7 is a diagram showing as a functional block diagram, the operation of the data centre.

FIG. 7 shows the computer network of FIG. 1, but sets out the functional components of software running on that computer network. Bundle Requests (FIG. 3) and Job Submissions (FIG. 4) are received by controller computer 32 which places the requests in an input queue 70 from which they are dequeued and handled by message handling component 71. The incoming messages are passed to a dispatcher 72 which forwards bundle requests (FIG. 2) into a second queue 74 which feeds an admission control module 76. The servers 36 are organised into pools 100, each of which is dedicated to running a particular type of job (in the example shown in FIG. 7, pool 100 is dedicated to running jobs of type 1, and pool 102 is dedicated to running jobs of type m). The dispatcher 72 forwards incoming job submissions (FIG. 4) to the job handler 80,90 which is dedicated to handling job submissions of the type found in the bundle request (FIG. 3). Each job handler includes a scheduler 84,94 which presents the incoming job submissions to a third queue 86,96 in a predetermined order. In the present example, the scheduler simply forwards the job submissions (FIG. 4) in the same order in which they arrive from the dispatcher 72. The dispatcher 72 is also responsible for forwarding the results of running jobs back to the proxy computer 16.

Figure 8:
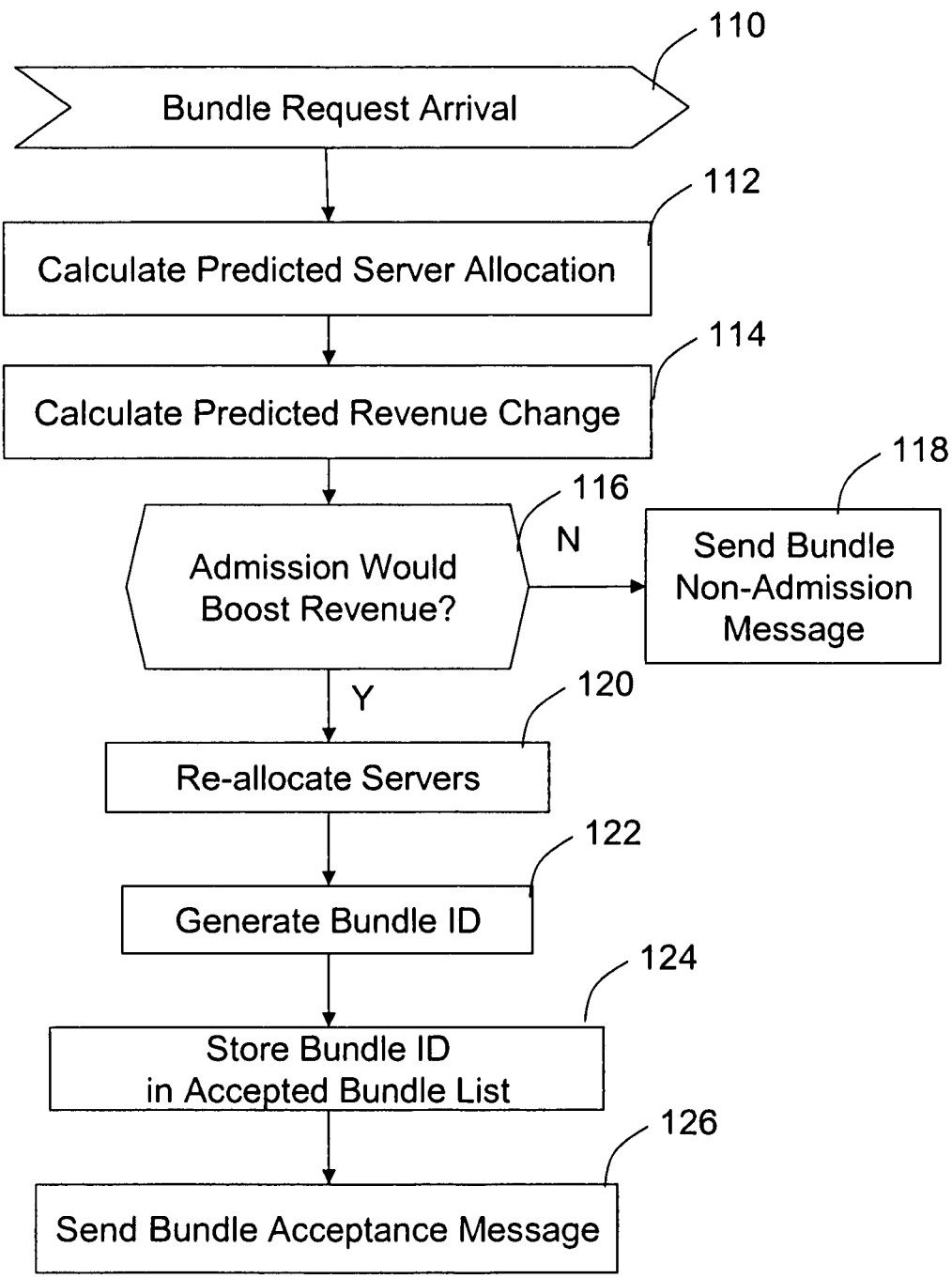
FIG. 8 is a flow-chart illustrating the processing carried out by the data centre's controller computer, in a first embodiment, in response to the arrival of a bundle request message from the enterprise network.

The processing carried out by the admission control 76 and resource allocation 78 modules on dequeuing a bundle request (FIG. 3) from the queue 74 will now be described with reference to FIG. 8.

On a bundle request message (FIG. 3) being taken (step 110) from the queue 74, the resource allocator 78 calculates (step 112) how the servers 36 would be allocated to the pools 100, 102 dedicated to the different job types, in the event that the bundle request were to be accepted by the data centre 30.

The putative server allocation is calculated in proportion to the offered load of each job type weighted by a factor representing the economic importance of that job type. The offered load of each ongoing bundle can be calculated by multiplying the arrival rate of jobs in the bundle (FIG. 5, third row) by the measured average service time for the bundle (FIG. 5, sixth row). The offered load for a job type can then be found by adding the offered load of each ongoing bundle of jobs of that type. The weighting factor might, for example, be calculated by dividing the penalty for breaching the service level for that job type (FIG. 2, third column) by the charge per job of that job type (FIG. 2, second column).

The putative server allocation is then used in calculating the likely average waiting time ($\beta_i$) for jobs of each type. Those skilled in the art will be able to provide methods for calculating an estimate of the likely average waiting time from the information found in the job bundle summary tables (FIG. 5) and job performance logs (FIG. 6). Having calculated an estimate of the likely average waiting time for each job type, the probability of the average waiting time exceeding the offered service level for each job type can be calculated using the expression $$P(Wi>x)=1-\Phi(x-\beta_i/\text{sqrt}(\beta_i/k_i))$$

where $k_i$ is the number of jobs in each bundle and $\Phi(.)$ is the cumulative distribution function of the standard normal distribution (mean 0, variance 1).

Using the calculated probability of the waiting time for a given job type exceeding the offered waiting time for that job type, the expected change in revenue for the data centre is calculated (step 114) by offsetting the revenue from charging for the jobs in the bundle against the increase in the probability of the data centre 30 having to pay a penalty for breaching service levels in relation to each job type in the system.

A test is then carried out (step 116) to find whether the change in revenue is positive. If it is not, then the bundle request is refused, the admission control then sending a bundle non-admission message via the dispatcher 72 and queue 73 to the proxy computer 16. The proxy computer 16 might then report this to its administrator who might retry the same request later on, or pass the request to another data centre.

If test (step 116) finds that the change in revenue is positive, then the data centre management software installed from CD-ROM or DVD-ROM 58 (FIG. 1) is used to re-allocate (step 120) the servers between the various job types as earlier calculated (in step 112) using the above-described economically-weighted offered load allocation. In the present examples, jobs already running on a server 36 are allowed to finish before re-allocation takes place.

A unique bundle ID is then generated (step 122) by the controller computer 32. The bundle ID is then added (step 124) to a list of accepted bundle IDs. Finally, an HTTP cookie is then set (step 126) on the proxy computer 16, that cookie including the bundle ID.

Figure 9:
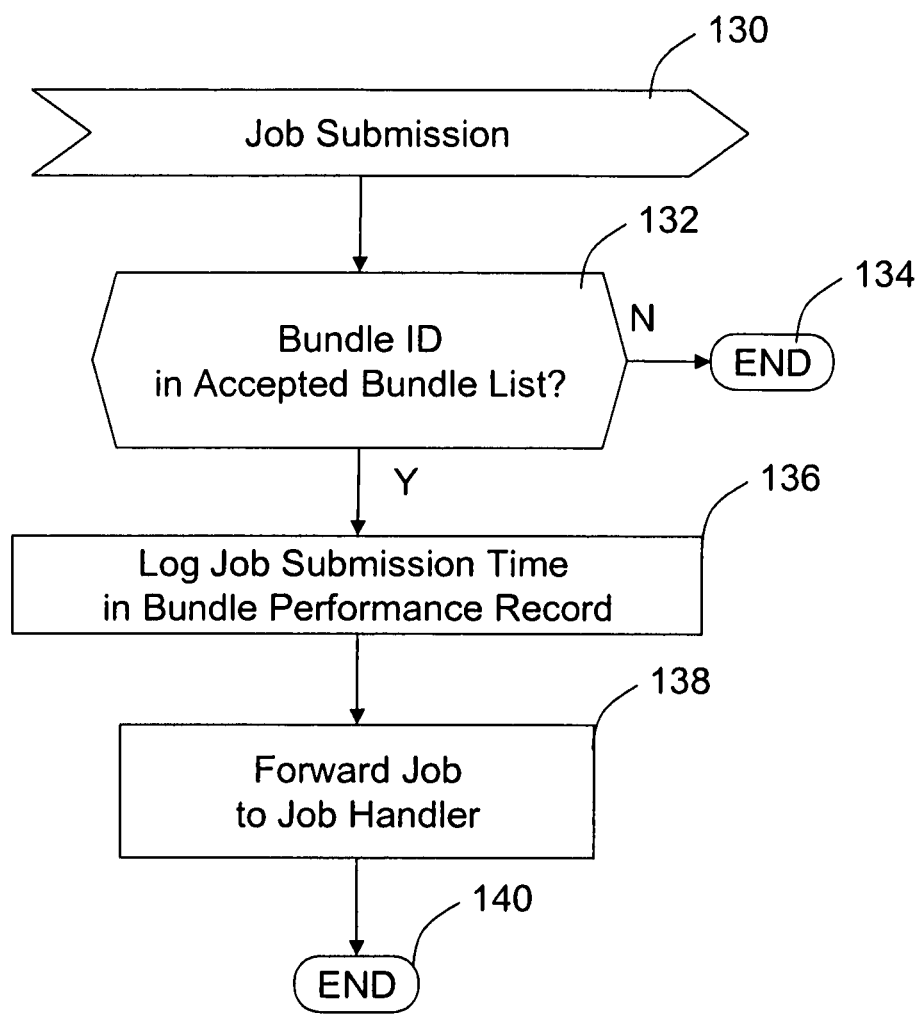
FIG. 9 is a flow-chart illustrating the processing carried out by the controller computer in response to receipt of a job submission message from the enterprise network.

The operation of the computer network in generating and handling a job submission message (FIG. 4) is illustrated in FIG. 9. The proxy computer generates (step 130) the job submission message, and includes in the header of the SOAP message, the HTTP cookie it received from the controller computer 32 when the bundle to which the job belongs was accepted. Similarly to the other communications between computers in this embodiment, the message is formatted in accordance with the SOAP protocol and contained within an HTTP message. In the present example, the Job Parameters can be placed in the body of the SOAP message, and can thus be encrypted so that only the servers 36 are able to read the contents of the SOAP body. Those skilled in the art will realise that the cookie provides state for the HTTP session and also acts as a bundle identifier. The proxy computer 16 then sends (step 131) the job submission message to the controller computer 32. On receiving the job submission message, the dispatcher checks (step 132) whether the bundle ID included in the message is included in the accepted bundle list. If the bundle ID is not included in that list, then the processing ends (step 134).

If, on the other hand, the bundle ID is found in the accepted bundle list, then the job submission time is logged (step 136) in the bundle's performance log (FIG. 6). The job submission message is then passed to the relevant job handler 80, 90 where it is placed into the job queue 86,96 and forwarded (step 138) to the relevant server pool 100, 102 when it reaches the front of that queue. Those skilled in the art will realise that it is this queuing delay which is estimated by the controller computer 32, for each job type, from the measurements recorded in the job bundle summary table (FIG. 5) and job performance table (FIG. 6). After submitted the job to a server in the appropriate pool 100, 102, the process ends (step 140).

Figure 10:
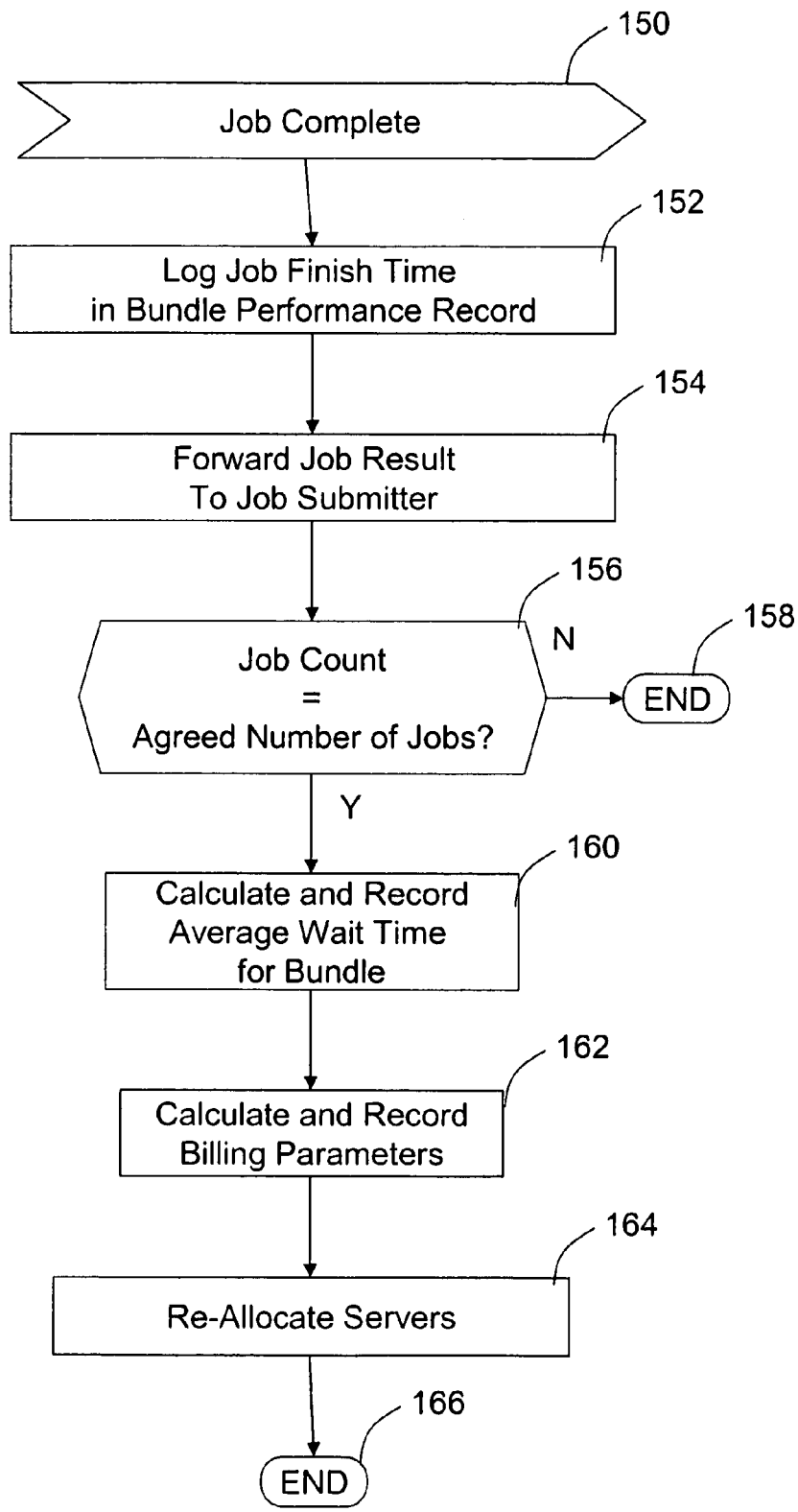
FIG. 10 is a flow-chart illustrating the processing carried out by the controller computer in response to receipt of a job completion message from the job handler.
Figure 11:
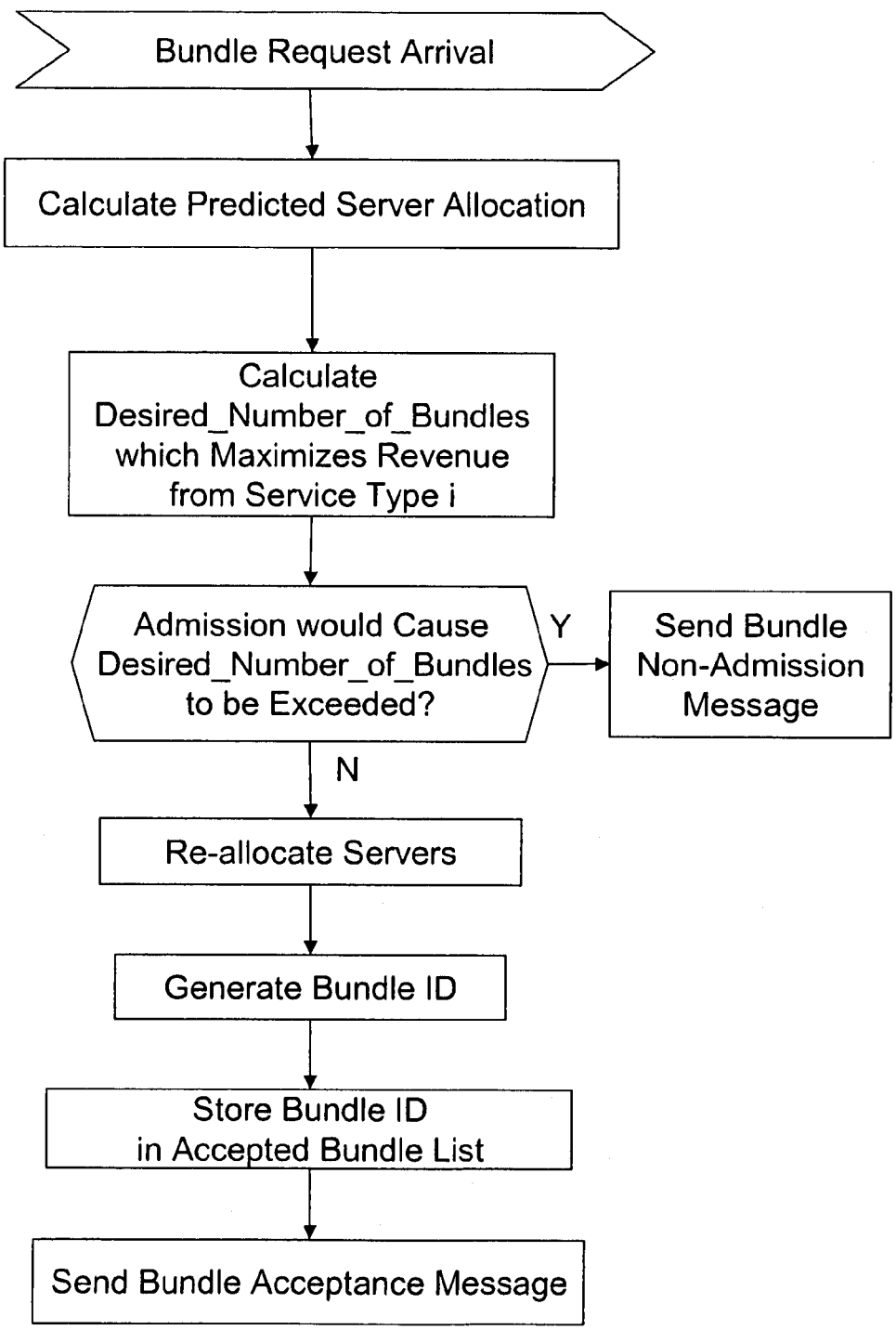
FIG. 11 is a flow-chart illustrating the processing carried out by the data centre's controller computer, in a second embodiment, in response to the arrival of a bundle request message from the enterprise network.

FIG. 10 illustrates the processing which takes place on the controller computer 32 receiving (step 150) a job completion message from a server 36.

Firstly, the controller computer 32 records the job completion time in the bundle performance log (FIG. 6). Thereafter, the job results are passed to the dispatcher 72 which forwards (step 154) the job results to the proxy computer 16 via queue 73.

Next, a bundle completion test (step 156) is carried out by finding whether the job count for this bundle now equals the number of jobs specified in the original bundle request message (FIG. 3). If more jobs from the bundle remain, then processing ends (step 158).

If, on the other hand, the bundle of jobs is now complete, then the average waiting time for jobs in the bundle is calculated and recorded (step 160) in the job bundle summary table (FIG. 5). Thereafter, the revenue owed to the data centre is calculated (step 162) by multiplying the number of jobs in the bundle by the charge per job (FIG. 2, second column) and subtracting the penalty if the average waiting time for the bundle (found in step 160) exceeds the offered service level (FIG. 2, fourth column).

The bundle is then marked as completed, and the server allocation module is called to re-allocate (step 164) the servers between job types.

The above described embodiment required detailed measurements of the wait times, service times, and variations in these values to be maintained by the controller computer 32. In a second embodiment, such measurements are not required. Whilst this has a negative impact on the performance of the system, that impact is not that great, so the relatively low computational demand offered by the second embodiment might be desirable in some instances.

In the second embodiment, the admission control is less dynamic in that the thresholds used in the admission control decision are not re-calculated each time a bundle request arrives. Instead they need only be recalculated when there is a significant change in the rate at which bundles of a given job type arrive ($\delta_i$), or the service time for a given job type ($b_i$).

The second embodiment involves a server allocation which allocates servers between job types in proportion to the expected offered load ($\Phi i$) of each job type. The controller computer 32 calculates (170) the expected offered load for each job type by multiplying the bundle arrival rate for job type i ($\delta_i$), by the average job arrival rate for the job type i ($\gamma_i$) and the number of jobs in bundles of jobs of type i ($k_i$)—(in the second embodiment it is assumed that all bundles of jobs of a given type have the same average job arrival rate and the same number of jobs within them. The controller computer 32 then calls modules in the data centre management software to re-allocate (step 171) the servers to job types in accordance with the server allocation it calculated in the previous step (170).

Those skilled in the art will be familiar with the Erlang-B formula which provides the probability of a call being rejected by a telephone network handling a given traffic intensity supplied with a given number of trunk lines. The present inventors have realised that this formula can be applied to find the probability of a bundle request for a given job type being refused should a number of servers be allocated to jobs of that type. For each job type, the server allocation $M_i$ calculated in step 170 is taken to be equivalent to the number of trunk lines, and the value $\sigma_i = \delta_i k_i / \gamma_i$ is taken to be equivalent to the traffic intensity. The likelihood of each possible number of bundles being active given the server allocation $M_i$ is then calculated. The expected revenue that would be obtained providing job type i if $M_i$ servers were allocated to job type i is then calculated. The set of thresholds $M_i$ which maximize the data centre's revenue is then found (step 172).

On receiving (step 174) a bundle request, the controller computer 32 then finds (step 176), using the active bundle count for each job type (FIG. 2, fifth column), whether admitting the newly requested bundle would cause the threshold number of bundles ($M_i$) for that job type (calculated in step 170) to be exceeded. If the threshold would be exceeded then the controller computer 32 sends (step 178) a bundle refusal message to the proxy computer 16. If however, admitting the bundle would not cause the threshold to be exceeded, then the controller computer generates (step 182) a bundle ID, stores (step 184) the bundle ID in an accepted bundle list and sends (step 186) a bundle acceptance message as described in relation to the first embodiment (FIG. 8).

It will be seen how the above embodiments enable a higher utilisation of a data centre than has previously been achieved by accepting new work requests which are found to be unlikely to cause the breach of service level agreements relating to work requests currently be carried out. More broadly, the job bundle admission controller (in this example, the controller computer 32) admits new job bundle requests if it estimates that carrying out the requested bundle of jobs will not cause the performance of the servers in carrying out said jobs to fall below and acceptable level. More broadly still, the job bundle admission controller admits new job bundle requests if it estimates that carrying out the requested bundle of jobs will not overload the servers. Furthermore, by bundling work requests together, the computation load associated with using admission control in a data processing system is reduced in comparison with carrying out admission control in relation to every work request received.

In alternative embodiments, the following variations might be made to the above-described embodiments:

i) rather than having the server computer generate a unique bundle identifier, the client computer could generate a unique bundle identifier and include it in the service bundle request. For example the bundle identifier might be the client computer's MAC address concatenated with a bundle request number which the client increments from one bundle request to the next (this number might loop round back to 1 after a predetermined number of bundle requests). Alternatively, the client computer could be constrained (by code and/or by commercial agreement) to follow a bundle requests with an uninterrupted stream of all the individual service requests to be included in the bundle. The network address—e.g. the IP address included in the bundle request message—would then serve to identify a subsequent service request as belonging to that particular bundle.

ii) whilst in the above embodiment, each service request was checked to find whether it belonged to an admitted bundle, in other embodiments the client computers could be constrained (by code and/or by commercial agreement) not to send service requests unless they had earlier received an indication that the service bundle to which the service request belongs had been earlier admitted.

iii) In the above embodiment, the service involved the server computers retrieving data from a variety of sources, carrying out some processing on that data, and sending the result of that processing to the client. However, the service could, for example, be one that involves the carrying out of some processing and the sending of a response (e.g. an address-to-postcode conversion service), or it could simply involve the storing of data (e.g. a digital file storage facility).

iv) in the above embodiment, one Service Level Agreement was stored by the controller computer 32 for each type of job. In other embodiments, the Service Level Agreement might vary between different bundles of the same type of job.

v) whilst, in the above embodiment, each bundle declared its job arrival rate and number of jobs as part of the bundle request, those figures could instead be fixed for a given type of job.

vi) whilst in the above example, the enterprise customer of the data centre had a number of personal computers, all of which communicated with the data centre via proxy computer 16, it is to be understood that it might simply only be computers belonging to customers of the enterprise which communicate via the Internet with the data centre 30 in order to obtain the services of the enterprise. This would, for example, be the situation where the service offered by the data centre was an online retailing web-site.

vii) whilst the above example described a data centre as providing the data processing services, other forms of service provisioning systems could be used instead. For example, a group of different users' personal computers could offer their data processing power to others.

viii) the above embodiment did not support the provision of different classes of service of a given job type. This could be achieved in other embodiments by amending the bundle request message (FIG. 3) to include a Class of Service Indication—e.g. 'Gold', 'Silver' or 'Bronze'. The job type table could then include different average waiting time values—and possibly different charges and penalties—for the different classes of service. This would not necessarily however necessitate the use of a different job handler for different classes of service. Instead, the scheduler 84, 94 in each job handler could divide the incoming job requests into class-based queues, and serve the queue with a weighted round robin method (e.g. repeatedly taking three job requests from the Gold queue, then two from the Silver queue and then one from the Bronze queue).

ix) in the above embodiment, the server computer indicated to the client computer that the bundle was accepted by sending a bundle request message. However, the acceptance could instead be indicated by not sending a message indicating that the request to carry out a bundle of jobs is not accepted.

x) whilst the above embodiments take account of the average arrival rate of jobs in a bundle of jobs, other measures indicative of the average arrival rate of jobs could be used. For example, the average inter-arrival time between jobs in the bundle could be used.

xi) whilst in the above embodiment, the function of the job bundle admission control was carried out on a different computer to the computer(s) which carried out the requested jobs, the job bundle admission control might in other embodiments instead be performed by a process running on one of the computer(s) arranged in operation to carry out the requested jobs.

In summary of the above, a distributed data processing system is disclosed. A problem with distributed data processing systems, especially data centres, is the low level of utilisation of those data centres. This is, in part, owing to data centre providers being concerned not to attract financial penalties levied by their customers in response to the quality of service provided to those customers by the data centre falling below service level agreed in service level agreements. Embodiments are disclosed which tackle this problem by having the data centre control the load placed upon it by carrying out an assessment of the likely impact of performing a requested bundle of jobs on jobs which are already running in the data centre. The decision whether to provide the requested bundle of jobs is then made by weighing-up the expected increase in penalties payable to customers against the revenue expected in return for running the requested bundle of jobs.

What is claimed is:

1. A computer network comprising a client computer, an online service provisioning system comprising a job admission controller and one or more server computers, and communication links connecting said client computer and online service provisioning system;

said client computer being arranged in operation to:
  i) generate a job bundle request message representing a request for said one or more server computers to fulfill a plurality of future job requests, each future job request requesting the carrying out of an individual data processing job; and
  ii) send said job bundle request message to said online service provisioning system;

said job admission controller being arranged in operation to:
  i) receive said job bundle request message;
  ii) estimate whether admitting said bundle of individual data processing jobs would overload said online service provisioning system;
  iii) determine whether said online service provisioning system is to fulfill said bundle of future job requests in accordance with said estimation; and
  iv) indicate said determination to said client computer; and said one or more server computers being arranged in operation to receive individual job requests in said bundle and to perform the jobs requested therein if said job admission controller has earlier admitted said bundle of jobs.

2. A computer network according to claim 1 wherein said job bundle request message includes a measure indicative of the predicted average arrival rate of jobs in said bundle.

3. A computer network according to claim 1 wherein said job admission controller is further arranged in operation to monitor a measure indicative of the current average arrival rate of jobs of a given type and the current average service time of jobs of a given type and to derive therefrom an estimate of the current load offered on the online service provisioning system by jobs of said given type.

4. A computer network according to claim 3 wherein said estimation involves said job admission controller calculating the probability that jobs of said type will be performed with a quality worse than a threshold performance level in determining whether to perform said requested bundle of jobs.

5. A computer network according to claim 4 wherein said one or more server computers are further arranged in operation to monitor the variation in inter-arrival time of jobs of a given type and the variation in the service time of jobs of a given type, said variations also being taken into account in calculating the probability that said requested bundle of jobs will be performed with a quality worse than a threshold performance level.

6. A computer network according to claim 1 wherein said one or more server computers perform a plurality of different job types, and said determination involves calculating an allocation of server computers to job types assuming that the requested bundle is admitted, and thereafter calculating the probability that the requested bundle of jobs will be performed with a quality worse than a threshold performance level.

7. A computer network according to claim 4, wherein said job admission controller is in communication with a store storing a financial penalty associated with performing a requested bundle of jobs with a quality worse than a threshold performance level, and a financial reward associated with performing a requested bundle of jobs with a quality better than said threshold performance level, said job admission controller determining whether to perform said bundle of jobs in dependence on the expected revenue from said bundle given said stored penalty and reward and the probability of said quality exceeding said threshold and/or the probability of said quality falling below said threshold.

8. A computer network according to claim 6 wherein said job admission controller is in communication with a store storing, for each type of job, a threshold performance level, a financial penalty associated with performing a requested bundle of jobs with a quality worse than said threshold performance level, and a financial reward associated with performing a requested bundle of jobs with a quality better than said threshold performance level, said job admission controller determining whether to perform said bundle of jobs in dependence on the expected revenue from said bundle given said stored penalty and reward and the probability of said quality exceeding said threshold and/or the probability of said quality falling below said threshold, and on the expected revenue from bundles of jobs which said one or more server computers have already started performing.

9. A computer network according to claim 1 wherein said online service provisioning system is arranged in operation to respond to said individual job request by finding whether said individual job request belongs to an earlier-admitted job bundle, and to meet said job request on finding that said service request does belong to an earlier-admitted bundle.

10. A computer network according to claim 1 wherein said job admission controller indicates the result of said determination by:
   a) generating a bundle admission indication message indicating whether said online service provisioning system is to provide said bundle of jobs; and
   b) sending said job bundle admission message to the sender of said service bundle request message;
   said client computer learning said determination by reading said bundle admission message.

11. A computer network according to claim 10 wherein said bundle admission indication message includes a job bundle identifier.

12. A method of operating an online service provisioning system comprising:
   receiving, in the online service provisioning system and from a client computer over a communications link, a job bundle request message representing a request for said service provisioning system to fulfill a plurality of future job requests, each future job request requesting the carrying out of an individual data processing job;
   estimating whether admitting said bundle of individual data processing jobs would overload said online service provisioning system;
   determining whether said online service provisioning system is to fulfill said bundle of future job requests in accordance with said estimation;
   indicating said determination to said client computer; and
   receiving individual job requests in said bundle and performing the job requested therein if said bundle of jobs has been earlier admitted.

13. A non-transitory computer-readable medium with a computer program executable to perform the method of claim 12 stored thereon.

14. A computer network according to claim 1 wherein said client computer is further arranged in operation to send job requests belonging to said bundle to said online service provisioning system on finding said indication to indicate that said bundle of individual data processing jobs is admitted.

15. An online service provisioning system comprising:
   a job admission controller; and
   one or more server computers;
   said job admission controller being configured to:
      receive, from a client computer over a communications link, a job bundle request message representing a request for said one or more server computers to fulfill a plurality of future job requests, each future job request requesting performance of an individual data processing job;
      estimate whether admitting said bundle of individual data processing jobs would overload said online service provisioning system;
      determine whether said online service provisioning system is to fulfill said bundle of future job requests in accordance with said estimation; and
      indicate said determination to said client computer; and
   said one or more server computers being configured to receive individual job requests in said bundle and perform the jobs requested therein if said job admission controller has earlier admitted said bundle of jobs.

16. The online service provisioning system according to claim 15 wherein said job bundle request message includes a measure indicative of the predicted average arrival rate of jobs in said bundle.

17. The online service provisioning system according to claim 15 wherein said job admission controller is further configured to monitor a measure indicative of the current average arrival rate of jobs of a given type and the current average service time of jobs of a given type and to derive therefrom an estimate of the current load offered on the online service provisioning system by jobs of said given type.

18. The online service provisioning system according to claim 17 wherein said job admission controller is further configured, for said estimation, to calculate the probability that jobs of said type will be performed with a quality worse than a threshold performance level in determining whether to perform said requested bundle of jobs.

19. The online service provisioning system according to claim 18 wherein said one or more server computers are further configured to monitor the variation in inter-arrival time of jobs of a given type and the variation in the service time of jobs of a given type, said variations also being taken into account in calculating the probability that said requested bundle of jobs will be performed with a quality worse than a threshold performance level.

20. The online service provisioning system according to claim 15 wherein said one or more server computers is configured to perform a plurality of different job types, and said determination involves calculating an allocation of server computers to job types assuming that the requested bundle is admitted, and thereafter calculating the probability that the requested bundle of jobs will be performed with a quality worse than a threshold performance level.

21. The online service provisioning system according to claim 18 wherein said job admission controller is further configured to communicate with a store storing a financial penalty associated with performing a requested bundle of jobs with a quality worse than a threshold performance level, and a financial reward associated with performing a requested bundle of jobs with a quality better than said threshold performance level, said job admission controller is configured to determine whether to perform said bundle of jobs in dependence on the expected revenue from said bundle given said stored penalty and reward and the probability of said quality exceeding said threshold and/or the probability of said quality falling below said threshold.

22. The online service provisioning system according to claim 20 wherein said job admission controller is further configured to communicate with a store storing, for each type of job, a threshold performance level, a financial penalty associated with performing a requested bundle of jobs with a quality worse than said threshold performance level, and a financial reward associated with performing a requested bundle of jobs with a quality better than said threshold performance level, said job admission controller is configured to determine whether to perform said bundle of jobs in dependence on the expected revenue from said bundle given said stored penalty and reward and the probability of said quality exceeding said threshold and/or the probability of said quality falling below said threshold, and on the expected revenue from bundles of jobs which said one or more server computers have already started performing.

23. The online service provisioning system according to claim 15 wherein said online service provisioning system is configured to respond to said individual job request by finding whether said individual job request belongs to an earlier-admitted job bundle, and to meet said job request on finding that said service request does belong to an earlier-admitted bundle.

24. The online service provisioning system according to claim 15 wherein said job admission controller is configured, in order to indicate the result of said determination, to:
    generate a bundle admission indication message indicating whether said online service provisioning system is to provide said bundle of jobs; and
    send said job bundle admission message to the sender of said service bundle request message.

25. The online service provisioning system according to claim 15 wherein the online service provisioning system is further configured to receive job requests belonging to said bundle which have been sent based on a finding of said indication to indicate that said bundle of individual data processing jobs is admitted.

* * * * *